May 26, 1959     J. W. HOLDEMAN ET AL     2,887,771
METHOD OF MAKING A BRAKE BAND
Original Filed Jan. 3, 1951     2 Sheets-Sheet 1
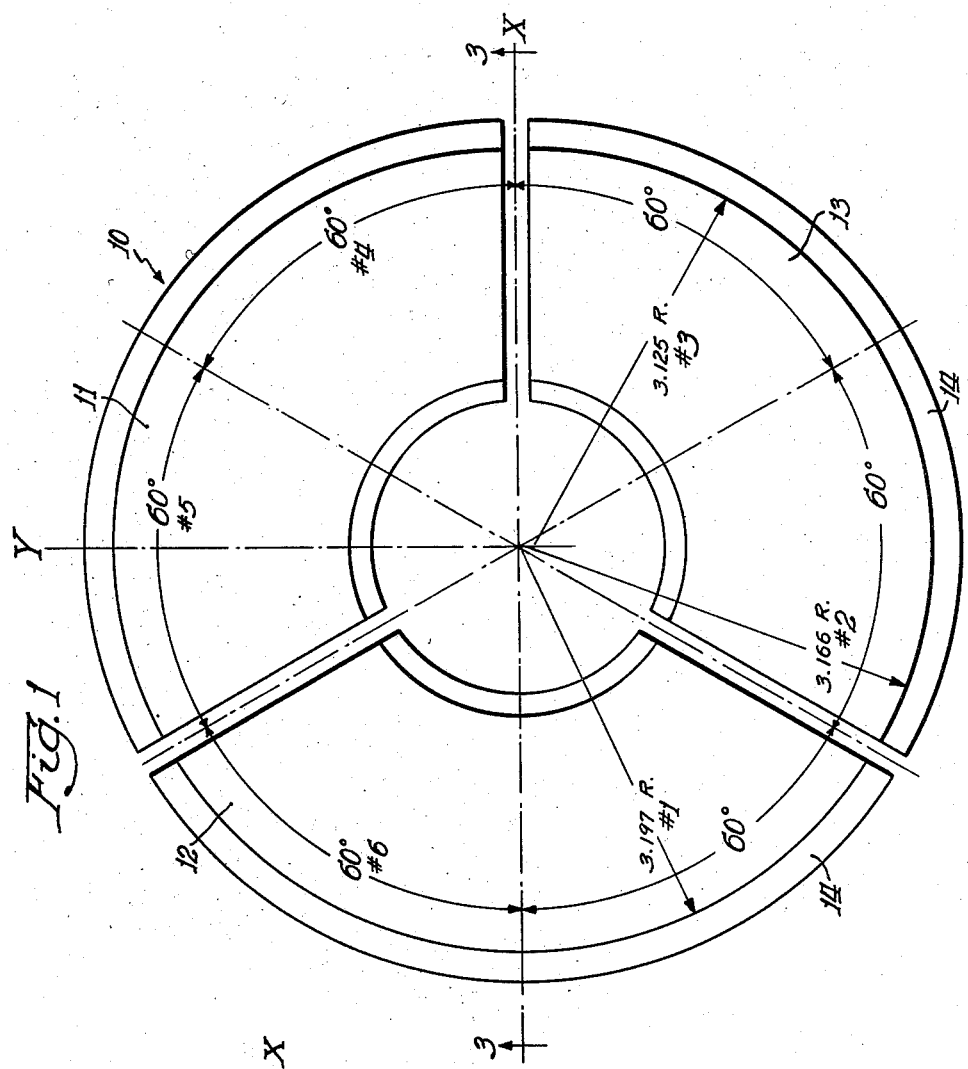
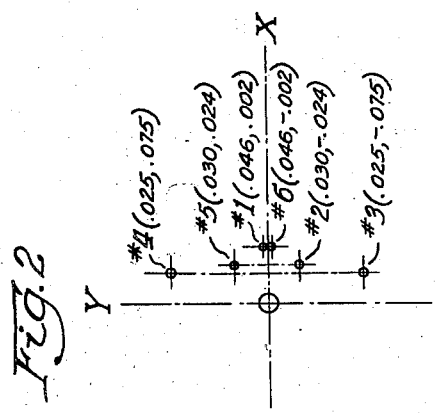
Inventors:
John W. Holdeman
and Eugene F. Farrell
By: Frank C. Parker
Atty.

May 26, 1959  J. W. HOLDEMAN ET AL  2,887,771
METHOD OF MAKING A BRAKE BAND
Original Filed Jan. 3, 1951  2 Sheets-Sheet 2

Inventors:
John W. Holdeman
and Eugene F. Farrell
By: Frank C. Parker
Atty.

United States Patent Office 2,887,771
Patented May 26, 1959

2,887,771

METHOD OF MAKING A BRAKE BAND

John W. Holdeman, Detroit, and Eugene F. Farrell, Grosse Pointe, Mich., assignors to Borg-Warner Corporation, Chicago, Ill., a corporation of Illinois Original application January 3, 1951, Serial No. 204,193, now Patent No. 2,768,714, dated October 30, 1956. Divided and this application January 13, 1956, Serial No. 558,880

10 Claims. (Cl. 29—418)

The present invention relates to brake bands and more particularly to a brake band for braking a substantially circular drum element of an automotive vehicle transmission brake.

This application is a division of our copending application, S.N. 204,193, filed January 3, 1951, now Patent No. 2,768,714, for "Brake Band."

The main object of the present invention is to provide a brake band, which when constricted to its working shape by the application of force to each end thereof, assumes the shape of a substantially true circle so that substantially every increment of length of the band engages the drum.

Another object of the present invention is to provide a method of making a brake band, which, when constricted to its working position, assumes substantially the shape of a true circle.

The practice generally followed heretofore in making brake bands for braking the rotatable drum elements of friction brakes has been to make the band substantially circular. The first step generally followed has been to place a strip of flexible material with its ends joined together around an expansible mandrel. The mandrel, which is substantially circular, is then expanded in order to impart its circular shape to the band. When the band is subsequently cut, it expands and assumes a substantially circular shape. When forces are thereafter applied to the ends of the expanded band, in order to contract it to its working shape, the band is no longer circular. Instead, the band becomes distorted due to the bending moment resulting from the forces which must be applied to the ends of the band in order to bring them to their working position. This bending moment is greatest at the mid-point of the band and tapers off to zero at the ends. Thus more bending occurs at the mid-point of the band and this prevents its taking a circular shape in its working position. When the brake lining is applied to the inner surface of the band the distortion mentioned above is great enough to produce a considerable variation in brake lining thickness when the lining is subsequently bored to provide a circular inner periphery when the band is constricted to its working position. Because of the variation in the thickness of the brake lining its life is shortened considerably. Since the brake band disclosed by the present invention is substantially circular when it is contracted to its working position, the necessity of boring the brake lining after it is cemented to the band is eliminated and because the thickness of the lining is substantially constant throughout its periphery, the life of the lining is greatly increased.

The method disclosed by the present invention for making a brake band wherein the distortion of the band from a substantially circular shape, when it assumes its working position, is eliminated consists of preforming the band so as to give it the correct amount of reverse distortion when in its free position to thereby cause it to assume the shape of a true circle when it is constricted to its working position.

The method disclosed herein consists of placing a substantially cylindrically shaped brake band, having its ends joined by a bracket welded thereto, around an expansible mandrel, the periphery of which has the proper amount of reverse distortion to properly shape the brake band when the mandrel is expanded. The brake band, after having been shaped by the expanded mandrel, is shot-peened on its inner diameter and friction material is then cemented thereto. The bracket is then severed and the band is permitted to assume its free shape. The shape of the free band is substantially the same as the shape of the expanded mandrel, however, the diameter is somewhat larger. When the band is thereafter compressed to its working shape by forces applied to the brackets on either end thereof it assumes substantially the shape of a true circle so that boring of the lining is unnecessary.

The method disclosed by the present invention produces an economical, cold worked high strength band wherein camber between the band and the friction lining is practically eliminated. When the band is expanded by the expansible mandrel, the strength of the weld between the bracket and the ends of the band are effectively tested. The present method allows considerably less accuracy in the initial forming of the band before the bracket is fastened in place. Inasmuch as the apparatus necessary for producing bands in accordance with the present invention is relatively inexpensive and because expensive machining operations to control the size of the band are unnecessary, the present invention provides a brake band that is cheap to manufacture and has a long life.

The above and numerous other objects and advantages of the present invention will become apparent from the following detailed description when read in conjunction with the accompanying drawings, wherein:

Fig. 1 is a plan view of the expansible mandrel constructed in accordance with the principles of the present invention;

Fig. 2 is a graphic diagram showing the location of the centers of the different sections of the mandrel shown in Fig. 1;

Figure 3:
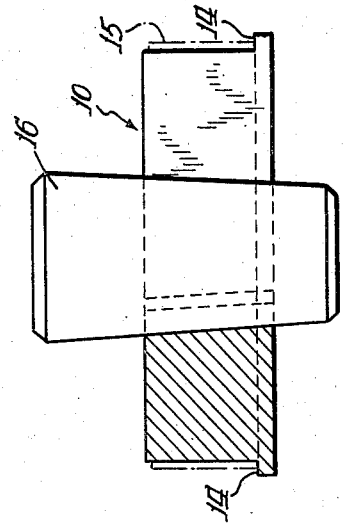
Fig. 3 is a side elevation view, shown partly in section, of the mandrel disclosed in Fig. 1.

With reference now to the drawings wherein like reference numerals designate identical parts in the several views, and referring in particular to Figs. 1 and 3, a non-circular expansible mandrel is indicated generally by reference numeral 10. The mandrel 10 comprises three individual segments 11, 12 and 13 and each of these segments covers an arc of approximately 120°. Each of the segments 11, 12 and 13 has a shoulder 14 for seating a brake band 15 around the mandrel. The inner periphery of each of the segments 11, 12 and 13 is cone shaped for receiving a complementary cone shaped expanding member 16. As is obvious, when the member 16 is forced downwardly, as viewed in Fig. 3, the segments 11, 12 and 13 are forced outwardly to thereby engage and expand the band 15 until it conforms substantially to the shape of the periphery of the mandrel 10.

As is apparent to those skilled in the art, a circularly shaped band does not contract to a true circle when forces are applied to its ends in order to bring them together. Because of the fact that the bending moment is greatest at the mid-point of the band and tapers off to zero at the ends, more bending occurs at the mid-point of the band and prevents its taking a circular shape when its ends are forced towards one another. In order to provide a band having a free shape that will constrict to a circular shape when forces are applied to its ends, it is necessary to determine the free shape of the band that will produce a true circular shape when its ends are moved towards one another. The mathematical calculation utilized in determining the free shape of a band that will compress to a circular shape when its ends are forced together will now be described.

Figure 8:
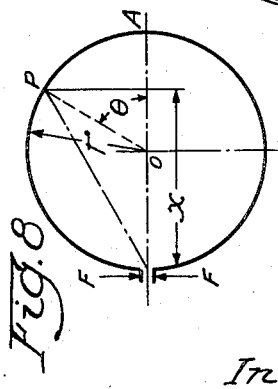
Figs. 8 and 9 show sketches utilized in computing the shape of the expansible mandrel.
Figure 9:
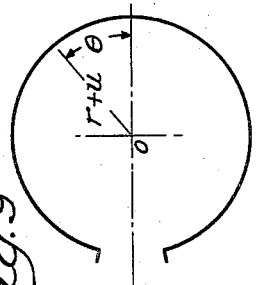

Referring to Fig. 8 a band or beam is shown in its compressed position in which its shape is a true circle. Fig. 9 shows the band in its expanded position. When the band occupies its compressed position its center is O and it has a constant radius $r$. In the free position of the band its center is still at point O but its radius is now $r+u$, where $u$ is a variable. F is the force that must be applied to each end of the band to bring the band to its compressed position, and therefore the bending moment at any point P on the periphery of the band is $Fx$. However, from Fig. 8 it is apparent that $x=r(1+\cos \theta)$ and therefore the bending moment M is represented by the equation $$M = Fr(1+\cos \theta) \quad (1)$$

The differential equation of a curved beam where E is the modulus of elasticity and I is the moment of inertia of a section of the beam, is $$\frac{EI}{r^2}\left(\frac{d^2u}{d\theta^2}+u\right) = M = Fr(1+\cos \theta) \quad (2)$$

The solution of this equation, using the rules for solving linear differential equations, is $$u = \frac{Fr^3}{EI}(1+\tfrac{1}{2}\theta \sin \theta) + A \cos \theta + B \sin \theta \quad (3)$$

The constants A and B depend only upon where the pole or center O is taken relative to the compressed ring. Since the line OA is an axis of symmetry, $u$ has the same value where $\theta=0$ as where it equals $$\frac{\pi}{n}$$

Therefore $$u_0 = \frac{Fr^3}{EI} + A$$

and $$u_n = \frac{Fr^3}{EI} - A$$

Therefore, since $u$ has the same value for $\theta=0$ and and $\theta=\pi$, $A=0$. When the band occupies its compressed position it assumes the shape of a true circle and under this condition $u=0$ throughout the periphery of the band and therefore $$\frac{du}{d\theta} = 0$$

But differentiating Equation 3 above with respect to $\theta$, it is apparent that $$\frac{du}{d\theta} = \frac{Fr^3}{EI}(\tfrac{1}{2} \sin \theta + \tfrac{1}{2}\theta \cos \theta) - A \sin \theta + B \cos \theta = 0$$

In this equation when $\theta$ equals 0, $$\frac{du}{d\theta} = B$$

and consequently $B=0$. Therefore the solution for Equation 3 above is $$u = \frac{Fr^3}{EI}(1+\tfrac{1}{2}\theta \sin \theta) \quad (4)$$

But since F, $r$, E and I are constants this equation may be written as follows $$u = a(1+\tfrac{1}{2}\theta \sin \theta) \quad (4a)$$

This equation therefore represents the shape of the band when it assumes its relaxed position. Because of the fact that the band assumes substantially the same shape as the expanded mandrel, even though the expanded band or free band has a somewhat greater radius, this equation also represents the shape of the expanded mandrel that is necessary to properly shape the band, so that when it is compressed it will assume the shape of a true circle.

By assigning appropriate values to F, $r$, E and I the shape of the mandrel may be computed. The locus corresponding to the shape of the mandrel may then be plotted on a scale several times the size of the mandrel in order to produce the required degree of accuracy and then the locus may be approximated by circular arcs. When the locus is approximated by circular arcs it is apparent that the machining of the mandrel is greatly facilitated. It has been found, where the mandrel has a diameter of approximately 6 inches, that three substantially equal arcs are generally satisfactory for an angular expanse of zero to 180° and because of the fact that the curve is symmetrical, the range from 180° to 360° can be obtained by inversion. This method of graphically constructing the shape of the mandrel is somewhat difficult to carry out to the required degree of accuracy and therefore it is preferable to use the following analytical method for arriving at the shape of the mandrel.

The analytical method for determining the shape of the mandrel will now be described. First the $x$, $y$ coordinates of the points on the curve formed by the periphery of the mandrel, for values of $\theta$ equal to 0, 30, 60, 90, 120, 150 and 180 degrees are computed. These $x$, $y$ coordinates may be determined by merely solving Equation 4 or 4a for the value of $u$ corresponding to the different values of $\theta$, and then the $x$ coordinate may be determined from the equation $x=(r+u) \cos \theta$ and the $y$ coordinate may be determined from the equation $y=(r+u) \sin \theta$.

Thus, the $x$, $y$ coordinates for each 30 degree point on the periphery of the mandrel are known. The next step is to determine the center of each circular arc of 60 degrees from $\theta=0$ to 180 degrees. Three points on each of these arcs have already been computed and from the principles of analytic geometry the equations for a circle through three points having $x$, $y$ coordinates equal respectively to $(x_0, y_0)$, $(x_1, y_1)$ and $(x_2, y_2)$, and having a center whose coordinates are $(h, k)$, are $$\begin{aligned}(x_0-h)^2+(y_0-k)^2&=r^2\\(x_1-h)^2+(y_1-k)^2&=r^2\\(x_2-h)^2+(y_2-k)^2&=r^2\end{aligned} \quad (5)$$

When these three equations are combined and solved for the values of $h$ and $k$ it is found that $$h = \frac{A_1+B_1-2kB_2}{2A_2} \quad (6)$$

and $$k = \frac{C_2(A_1+B_1)-A_2(C_1+D_1)}{2(C_2B_2-A_2D_2)}$$

where $$\begin{aligned}A_1&=x_1^2-x_0^2; \quad A_2=x_1-x_0\\B_1&=y_1^2-y_0^2; \quad B_2=y_1-y_0\\C_1&=x_2^2-x_1^2; \quad C_2=x_2-x_1\\D_1&=y_2^2-y_1^2; \quad D_2=y_2-y_1\end{aligned}$$

From these equations the coordinates $(h, k)$ representing the center of the arc through the points corresponding to θ=0, 30 and 60 degrees, may be computed. This same procedure may be used for determining the centers of the arcs through the points corresponding to θ=60, 90 and 120 degrees, and through the points corresponding to θ=120, 150 and 180 degrees. The other half of the periphery of the mandrel is symmetrical and of course may be readily computed. Having determined the coordinates for the center (h, k) for each arc, and since the coordinates (h, k) are known for one point on each arc, the radius of each arc may be determined from the following equation $$R=\sqrt{(x-h)^2+(y-k)^2} \qquad (7)$$

The mandrel 10, shown in Fig. 1, as has already been described, has three segments 11, 12 and 13. Each of the segments is divided into two sections of approximately 60 degrees each, the peripheries of each section having centers corresponding respectively to points 1–6, shown in Fig. 2. The mean radius of the mandrel 10 (shown in Fig. 1) is 3.173 inches and each 30 degree point on the periphery thereof has been computed in accordance with the analytical method described above. Each 60 degree section of the mandrel 10 is identified in Fig. 1 by numerals 1–6 and the centers of curvature of each of these sections are identified by the corresponding numerals 1–6 in Fig. 2. In each of the Figs. 1 and 2 the positive x-axis extends from the center of the figure to the right along the horizontal and the positive y-axis extends from the center of the figure upwardly along the vertical. The coordinates (h, k) representing the centers of the different sections and the radii for each of the sections, represented in inches, are given in the following table.

| Section | Center | | Radius |
|---|---|---|---|
| | h | k | |
| 1 | .046 | .002 | 3.197 |
| 2 | .030 | −.024 | 3.166 |
| 3 | .025 | −.075 | 3.125 |
| 4 | .025 | .075 | 3.125 |
| 5 | .030 | .024 | 3.166 |
| 6 | .046 | −.002 | 3.197 |

From the above table it is apparent that the periphery of the mandrel 10 is non-circular. However, each of the sections 1–6 has a circular curvature and this facilitates the machining of the mandrel. Actually the shape of the periphery of the expanded mandrel 10 approximates very closely, Equation 4 or 4a set forth above and for all practical purposes a brake band formed by the mandrel shown in Fig. 1 has such a configuration that it will assume the shape of substantially a true circle when its ends are forced together to bring it into engagement with a circular brake drum. It is apparent that the configuration of the mandrel 10 and of the brake band 15 is substantially cardioidal.

Figure 5:
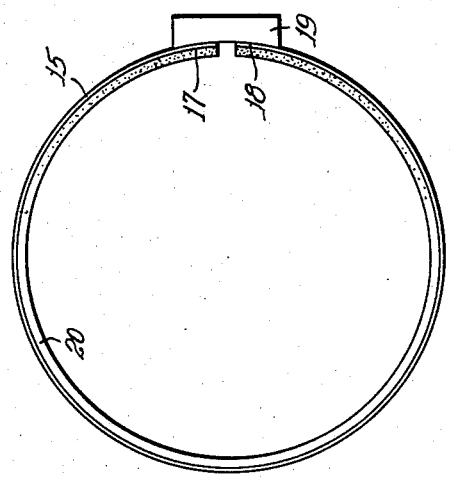
Fig. 5 shows a band having friction material cemented on the inner surface thereof.
Figure 7:
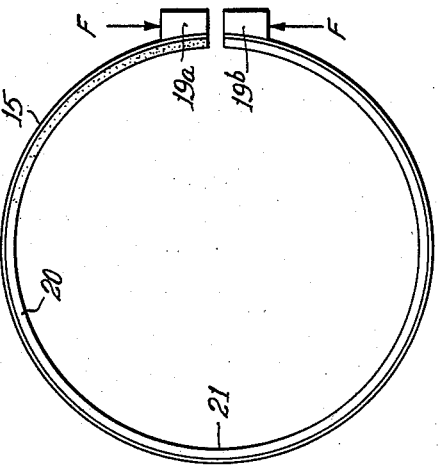
Fig. 7 shows the band compressed to its substantially circular working position.
Figure 4:
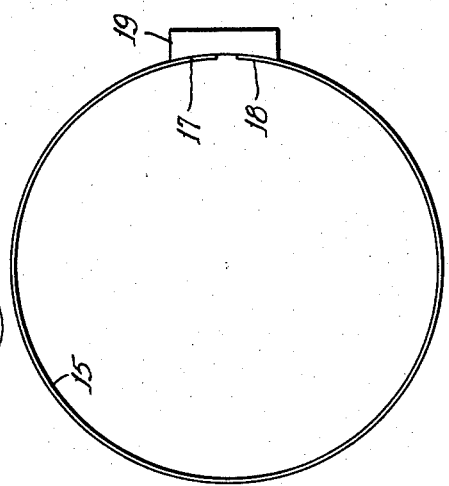
Fig. 4 shows an unlined band with its attached bracket forming a closed ring that has been stretched over an expanded mandrel of the type shown in Fig. 1.

In practicing the method of the present invention the mandrel 10 is first contracted. The brake band 15, having its ends 17 and 18 joined together by means of a bracket 19 secured, such as by welding, to each of the ends 17 and 18, and having a generally cylindrical configuration is placed in position over the mandrel 10. The expanding member 16 is then driven downwardly to cause the segments 11, 12 and 13 to expand and engage the band 15. The cardioidal shape of the mandrel 10 is thereby imparted to the brake band 15. The next method step, which is illustrated in Fig. 5, comprises the fastening of a brake liner 20 on the inner periphery of the band 15. The brake liner 20 consists of any suitable friction inducing material and may be fastened to the band by cement or any other suitable means.

Figure 6:
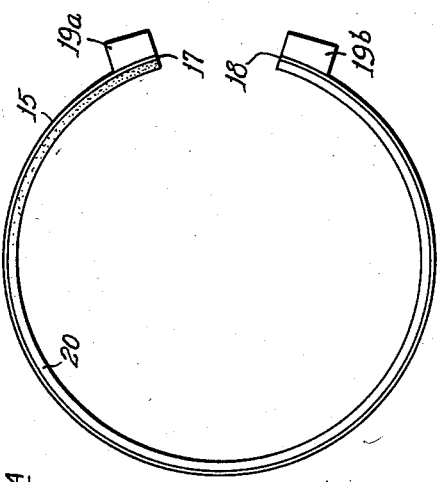
Fig. 6 shows a band in expanded condition after the bracket has been severed.

The next method step consists of cutting the bracket 19 so that it forms a pair of force receiving lugs 19a and 19b. When the bracket 19 is cut, the band 15 and liner 20 expand to the position as shown in Fig. 6. The expanded or free band 15 retains its cardioidal shape even though its mean radius is somewhat greater than the mean radius of the expanded mandrel 10. When forces F are directed in a straight line towards each other against both of the force receiving lugs 19a and 19b the brake band 15, together with the liner 20, is compressed and assumes a working shape that is substantially circular. Because of this circular working shape of the band and liner it is unnecessary to bore the liner 20 in order that it will engage a circular brake drum at all points on the periphery of the liner. The reason that the band 15 assumes a substantially circular shape when compressed by the forces F is that mid-point 21 has the greatest radius of curvature and the radius of curvature progressively decreases towards either end 17 or 18 of the band. Since the bending moment at any point on the periphery of the band is equal to the force F multiplied by the distance between that point and the line of application of the force F, it is apparent that the bending moment is greatest towards the mid-point 21 of the band and progressively decreases towards the ends 17 and 18 of the band. Due to the greater radius of curvature of the middle portions of the band these portions must be bent more in order for them to approach a true circle and consequently since the bending moment is greater progressively from the end of the band to the mid-point thereof, the sections of the band having the greater radius of curvature are bent more, and thus the entire band is compressed to a substantially circular working position.

In the description above, of the method of making the brake band in accordance with the present invention, the liner 20 has been described as being secured to the band after the band itself has been expanded and shaped by the mandrel. It is to be noted, however, that the liner may just as well be attached to the band before the band shaping operation, if the liner is made of a material which will expand properly and will not be distorted during the shaping operation. This method of practicing the invention is particularly applicable to bi-metal bands when the two metals are more readily bonded together prior to the shaping operation and one of the metals serves as the liner.

The mandrel 10 is disclosed in the drawings and described above as comprising three substantially equiangular sections, however, this is merely illustrative and we do not intend to be limited to this construction. We therefore desire to point out that it is within the realm of the present invention to utilize a mandrel or arbor consisting of any number of sections, each of which may be either substantially equiangular or some or all of which may be of substantially different sizes.

When the arbor is expanded to shape the band the tendency is for the portions of the periphery of the band which lie over the spaces between adjacent sections to be straight but when these spaces are narrow this tendency is negligible. The size of the spaces between adjacent sections, when the arbor is expanded, is inversely proportional to the number of sections in the arbor and it is therefore sometimes desirable to increase the number of sections to some number greater than three in order to decrease the size of the spaces. Even though the arbor is comprised of more than three sections it has been found, if the overall shape of the arbor is the same as the overall shape of the three section arbor described herein, that the arbor will produce an entirely satisfactory band. If it is desired to have the shape of the expanded mandrel more nearly approach Equation 4 or 4a it is within the realm of the present invention to have the periphery of the arbor conform to any number of cylindrical segments. It is thus apparent that the arbor can be formed by first grinding the peripheral surface thereof to conform to the desired number of cylindrical segments and then the arbor can be cut into the desired number of sections which may be equiangular or of different sizes.

As is apparent from the above description, the present invention provides a brake band which when moved to its working position assumes substantially the shape of a true circle. Therefore, the brake band engages the brake drum at all points on its periphery, and because of the uniform initial contact, the torque handling capacity of this band is higher than the capacity of a band which is substantially circular in the free position. This is true because the additional force required to make the conventional band conform to the drum, detracts from the force available for braking.

It is contemplated that numerous changes may be made in the present invention without departing from the spirit or scope thereof.

We claim:

1. The method of making a brake band having a working configuration approximating a true circle comprising the steps of: placing a closed substantially cylindrical metal band which is flexible and deformable for substantially all of its circumference around a non-circular expansible mandrel having an external expanded periphery corresponding approximately to the equation $$u = \frac{Fr^3}{EI}\left(1 + \frac{\theta}{2}\sin\theta\right)$$

where $u$ is the change in the radius of the band, E is the modulus of elasticity of the flexible metal strip, I is the moment of inertia of the strip, $r$ is the mean radius of the expanded mandrel, F is the force required to bend the band to a substantially circular shape after it has been expanded, and $\theta$ is the angle subtended by the external periphery of the mandrel measured from the point on the periphery having the greatest radius of curvature; expanding the mandrel to impart a configuration to the band corresponding substantially to the configuration of the external periphery of the expanded mandrel; and severing the closed flexible metal band at a point 180° from the point having the greatest radius of curvature imparted thereto.

2. The method of making a brake band having a generally cardioidal relaxed configuration and a working configuration approximating a true circle comprising the steps of: placing a substantially cylindrical flexible metal strip, having its ends joined by a metal lug securely fastened thereto, around a generally cardioidally shaped expansible mandrel positioning the lug at a point diametrically opposite from a point on the mandrel having the greatest radius of curvature; expanding the mandrel a substantially equal amount at all points on its periphery to impress the generally cardioidal shape of the mandrel to the strip; securely fastening a uniform layer of friction inducing material on the inner periphery of said strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

3. The method of making a brake band having a non-circular relaxed configuration and a working configuration approximating a true circle comprising the steps of: placing a substantially cylindrical flexible metal strip, having its ends joined by a metal lug securely fastened thereto, around an expansible mandrel, the periphery of which comprises a plurality of sections of such size and contour as to produce in the expanded condition a substantially cardioidal shape when all of the sections are lying in the same transverse plane; positioning the lug at a point diametrically opposite from a point on the mandrel having the greatest radius of curvature; expanding the mandrel a substantially equal amount at all points on its periphery to impress the shape of the mandrel to the strip; securely fastening a uniform layer of friction inducing material on the inner periphery of said strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

4. The method of making a brake band having a non-circular relaxed configuration and a working configuration approximating a true circle comprising the steps of: placing a substantially cylindrical flexible metal strip, having its ends joined by a metal lug securely fastened thereto, around an expansible mandrel, the periphery of which comprises a plurality of substantially circular sections, of such size and contour as to produce in the expanded condition a substantially cardioidal shape when all of the sections are lying in the same transverse plane; positioning the lug at a point diametrically opposite from a point on the mandrel having the greatest radius of curvature; expanding the mandrel a substantially equal amount at all points on its periphery to impress the shape of the mandrel to the strip; securely fastening a uniform layer of friction inducing material on the inner periphery of said strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

5. The method of making a brake band having a non-circular relaxed configuration and a working configuration approximating a true circle comprising the steps of: placing a substantially cylindrical flexible metal strip, having its ends joined by a metal lug securely fastened thereto, around an expansible mandrel comprising three sections subtending substantially equal angles at the center of the mandrel and of such size and contour as to produce in the expanded condition a substantially cardioidal shape when all of the sections are lying in the same transverse plane, the periphery of one of said sections comprising two substantially equal length cylindrical portions having the same radius of curvature and different centers, the peripheries of the other two sections each comprising two substantially equal length cylindrical portions, the cylindrical portions of said last-mentioned sections adjacent said one section having identical radii of curvature that are slightly smaller than the radii of curvature of said first two portions and the other two portions of said other two sections being adjacent each other and having identical radii of curvature still smaller than either of said other radii of curvature; positioning the lug at a point on the mandrel 180° from the point having the greatest radius of curvature; expanding the mandrel a substantially equal amount at all points on its periphery to impress the shape of the mandrel to the strip; securely fastening a uniform layer of friction inducing material on the inner periphery of said strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

6. The method of making a brake band having a non-circular relaxed configuration and a working configuration approximating a true circle comprising the steps of: placing a substantially cylindrical flexible metal strip, having its ends joined by a metal lug securely fastened thereto, around an expansible mandrel comprising a plurality of sections each of which subtends an angle at the center of the mandrel, said sections being of such size and contour as to produce in the expanded condition a substantially cardioidal shape when all of the sections are lying in the same transverse plane, the peripheral surface formed by all of said sections comprising a plurality of substantially cylindrical portions, the cylindrical portion at one point on the periphery of the mandrel having a certain radius of curvature and the radii of curvature of the other portions progressively decreasing towards the portion 180° from said one portion; positioning the lug at a point on the mandrel 180° from the point having the greatest radius of curvature; expanding the mandrel a substantially equal amount at all points on its periphery to impress the shape of the mandrel to the strip; and severing the lug between the ends of the strip to allow it to expand to a relaxed configuration, the portion of said severed lug on each end of said severed strip providing a force receiving lug whereby the ends of the band may be urged toward each other whereupon the band assumes a substantially circular configuration.

7. The method of making a brake band having a non-circular relaxed configuration and a working configuration approximating a true circle comprising the steps of: placing a substantially cylindrical flexible metal strip having a deformable uniform layer of friction inducing material on the inner periphery thereof and having its ends joined by a metal lug securely fastened thereto, around an expansible mandrel, the periphery of which comprises a plurality of substantially circular sections of such size and contour as to produce in the expanded condition a substantially cardioidal shape when all of the sections are lying in the same transverse plane and having different radii of curvature and different centers; positioning the lug at a point on the mandrel 180° from the point having the greatest radius of curvature; expanding the mandrel a substantially equal amount at all points on its periphery to impress the shape of the mandrel to the strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

8. The method of making a brake band having a non-circular relaxed configuration and a working configuration approximating a true circle comprising the steps of: placing a substantially cylindrical flexible metal strip, having its ends joined by a metal lug securely fastened thereto, around an expansible mandrel, the periphery of which comprises a plurality of substantially circular sections of such size and contour as to produce in the expanded condition a substantially cardioidal shape when all of the sections are lying in the same transverse plane; positioning the lug at a point on the mandrel 180° from the point having the greatest radius of curvature; expanding the mandrel a substantially equal amount at all points on its periphery to impress the shape of the mandrel to the strip; and severing the lug between the ends of the strip to allow it to expand to a relaxed configuration, the portion of said severed lug on each end of said strip providing a force receiving lug whereby the ends of the band may be urged toward each other whereupon the band assumes a substantially circular configuration.

9. The method of making a brake band having a non-circular relaxed configuration and a working configuration approximating a true circle comprising the steps of: providing a substantially cylindrical metal strip having its ends joined by a relatively short metal lug secured to said ends; providing an expansible mandrel comprising a plurality of arcuate sections of such size and contour as to produce in the expanded condition a substantially cardioidal shape when all of the sections are lying in the same transverse plane and the expanded periphery is slightly greater than the periphery of the substantially cylindrical band and of the circular periphery desired in closed band; placing said band around said mandrel with said lug spaced 180° from the point of greatest radius of curvature of the mandrel; expanding the mandrel to impart to the band a cardioidal configuration corresponding to that of the expanded mandrel; and severing the lug at its center for thereby providing force receiving lugs on the ends of said band.

10. The method of making a brake band having a non-circular relaxed configuration and a working configuration approximating a true circle comprising the steps of providing a substantially cylindrical flexible metal band having its ends joined by a metal lug securely fastened thereto; providing an expansible mandrel of a substantially cardioidal shape corresponding approximately to the equation $$u = \frac{Fr^3}{EI}\left(1 + \frac{\theta}{2} X \sin \theta\right)$$

where $u$ is the change in the radius of the band, E is the modulus of elasticity of the flexible metal strip, I is the moment of inertia of the strip, $r$ is the means radius of the expanded mandrel, F is the force required to bend the band to a substantially circular shape after it has been expanded, and $\theta$ is the angle subtended by the external periphery of the mandrel measured from the point on the periphery having the greatest radius of curvature; placing said band on said mandrel with said lug positioned at a point 180° from the point of greatest radius of curvature of the mandrel; expanding the mandrel to impart to the band a cardioidal configuration corresponding to that of the expanded mandrel; and severing the lug through the center thereof to provide force receiving lugs on the end of said band.

References Cited in the file of this patent
UNITED STATES PATENTS
1,732,630     Bennet                Oct. 22, 1929